United States Patent [19]

Lopez

[11] Patent Number: 4,848,296
[45] Date of Patent: Jul. 18, 1989

[54] ROTARY INTERNAL COMBUSTION ENGINE

[76] Inventor: Frank Lopez, 129 Winnie Way, Arcadia, Calif. 91006

[21] Appl. No.: 277,485

[22] Filed: Nov. 29, 1988

Related U.S. Application Data

[63] Continuation of Ser. No. 138,728, Dec. 23, 1987, abandoned.

[51] Int. Cl.$^4$ .............................................. F02B 53/00
[52] U.S. Cl. ..................................... 123/242; 418/61.1
[58] Field of Search ............. 123/242; 418/61 R, 139, 418/241

[56] References Cited

U.S. PATENT DOCUMENTS

| | | | |
|---|---|---|---|
| 3,743,451 | 7/1973 | Chapman | 418/61 R |
| 3,953,159 | 4/1976 | Hunter | 418/61 R |
| 3,964,442 | 6/1976 | Hunter | 123/242 |
| 4,585,404 | 4/1986 | Barata | 418/61 R |

FOREIGN PATENT DOCUMENTS 2349247 4/1974 Fed. Rep. of Germany .... 418/61 R

*Primary Examiner*—Michael Koczo
*Attorney, Agent, or Firm*—Christie, Parker & Hale

[57] ABSTRACT

A rotary internal combustion engine comprises a cylindrical casing and a cylindrical rotor. Several stepped crankshafts rotatably connected to the rotor pass through the ends of the casing, thereby confining motion of the rotor to orbital motion. Radial vanes extend from an axial shaft in the casing to the inner surface of the casing wall and form seals against the casing. Combustion chambers are formed between adjacent vanes. Intake, exhaust, and ignition systems provide a combustion cycle for each chamber as the rotor orbits.

7 Claims, 11 Drawing Sheets

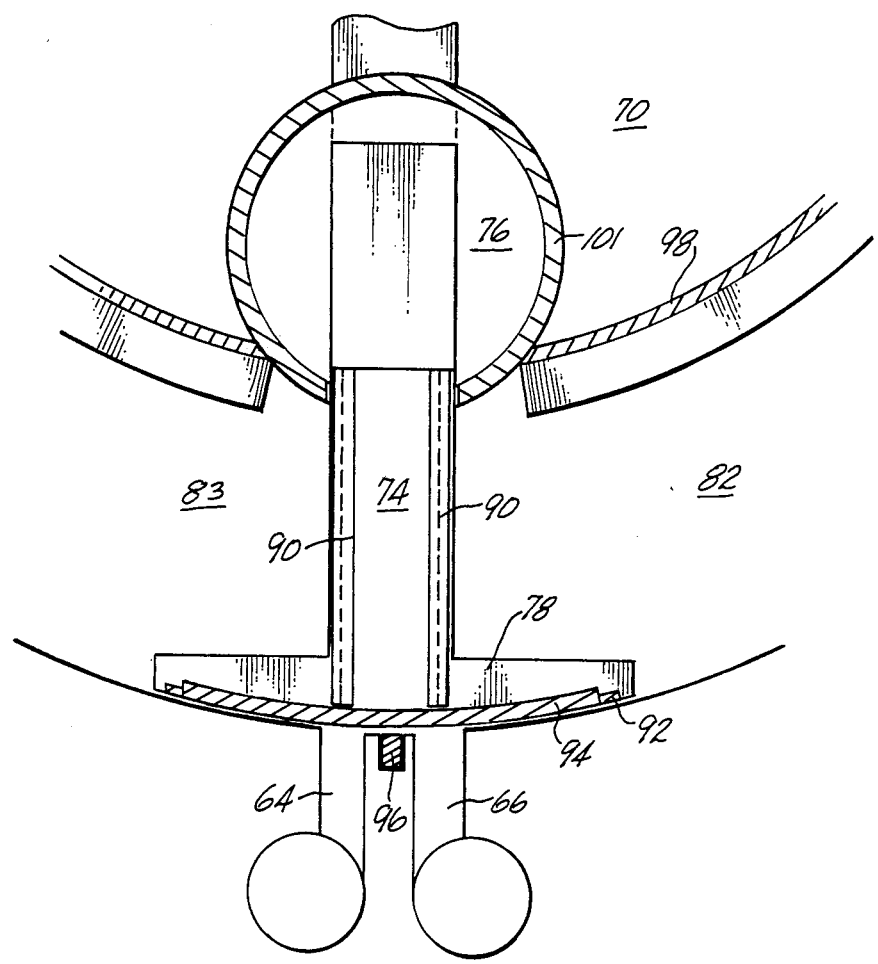

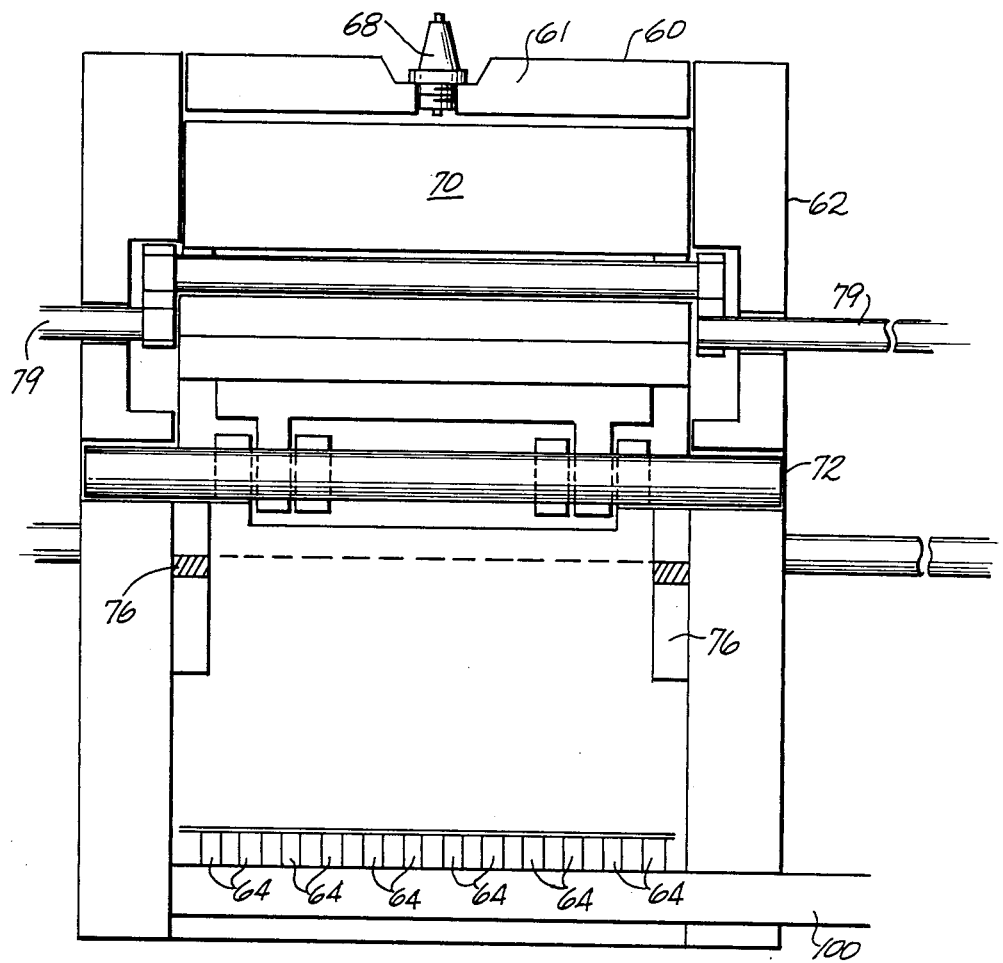

ROTARY INTERNAL COMBUSTION ENGINE

This is a continuation of application Ser. No. 138,728, filed Dec. 23, 1987, abandoned.

FIELD OF THE INVENTION

The invention pertains to rotary internal combustion engines and more specifically to an orbiting rotary engine having a cylindrical casing, a cylindrical rotor, and pivoting vanes.

BACKGROUND OF THE INVENTION

A conventional rotary internal combustion engine comprises a rotor which rotates and orbits within a casing. Mounted on the rotor are replaceable seals between the rotor and the casing which separate the combustion chambers. Because of the large number of high speed rotations and because the seals sweep the entire inner surface of the casing with each rotation, the seals are subjected to a great amount of wear; they must be replaced frequently.

The problem of seal wear has been helped substantially by the advent of rotors which do not rotate within the casing but merely orbit about the center of the casing. Since the seals do not sweep around the entire casing, but only move back and forth over a small area, seal wear is substantially reduced. This is described, for example, in U.S. Pat. No. 3,743,451 to Chapman.

Typically orbiting designs, however, tend to require special shapes for their housings and rotors which are expensive and difficult to manufacture.

SUMMARY OF THE INVENTION

The present invention provides a rotary internal combustion engine. A casing having a generally cylindrical inner surface houses a generally cylindrical rotor which orbits within the casing.

The rotor is hollow through its center. A cylindrical shaft, coaxial with the casing extends through the hollow interior of the rotor. Several vanes are mounted on the shaft and afforded pivotal movement about the shaft. The vanes extend radially outward through the rotor to the interior surface of the casing. Seals are provided between the vanes and the casing and between the vanes and the rotor so that combustion chambers are formed between the vanes, the rotor and casing forming inner and outer walls.

As it orbits, the rotor slides on the vanes, changing the size of the combustion chambers. The vanes undergo reciprocating movement across a limited area of the casing as the rotor orbits. Each combustion chamber is connected to fuel and air input, exhaust, and ignition systems.

One or more stepped crankshafts are connected to one or both ends of the rotor. One end of the crankshafts is rotatably mounted to the rotor. The other end of the crankshaft extends out of the casing through fixed holes. The crankshafts are stepped between the rotor and the holes in the casing so that when the rotor orbits within the casing, the crankshafts rotate, providing the engine's power takeoff.

BRIEF DESCRIPTION OF THE DRAWINGS

FIG. 12 is an enlarged view of the vane head shown in FIGS. 5 to 10 and its environment showing the location of the seals;

FIG. 13 is a cutaway view of a second embodiment of the present invention taken parallel to the rotor's axis.

DETAILED DESCRIPTION OF THE INVENTION

Figure 1:
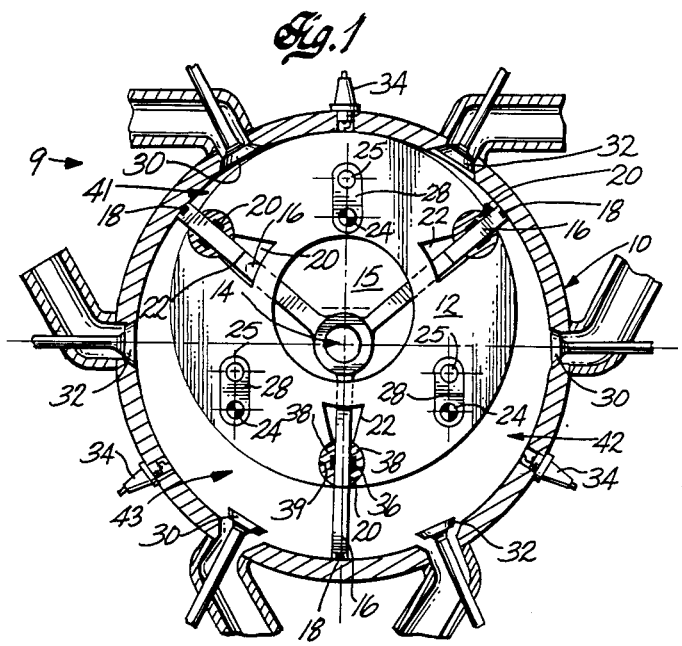
FIG. 1 is a cutaway view of a first embodiment of the present invention taken perpendicular to the rotor's axis.

One exemplary embodiment of the present invention is a four-stroke cycle, single rotor, three-chamber rotary engine design as shown in FIGS. 1–4. The rotary engine 9 comprises a casing 10 comprising a generally cylindrical drum 49 having apertures cut into it for valves 30 and 32 and sparkplugs 34.

Figure 4:
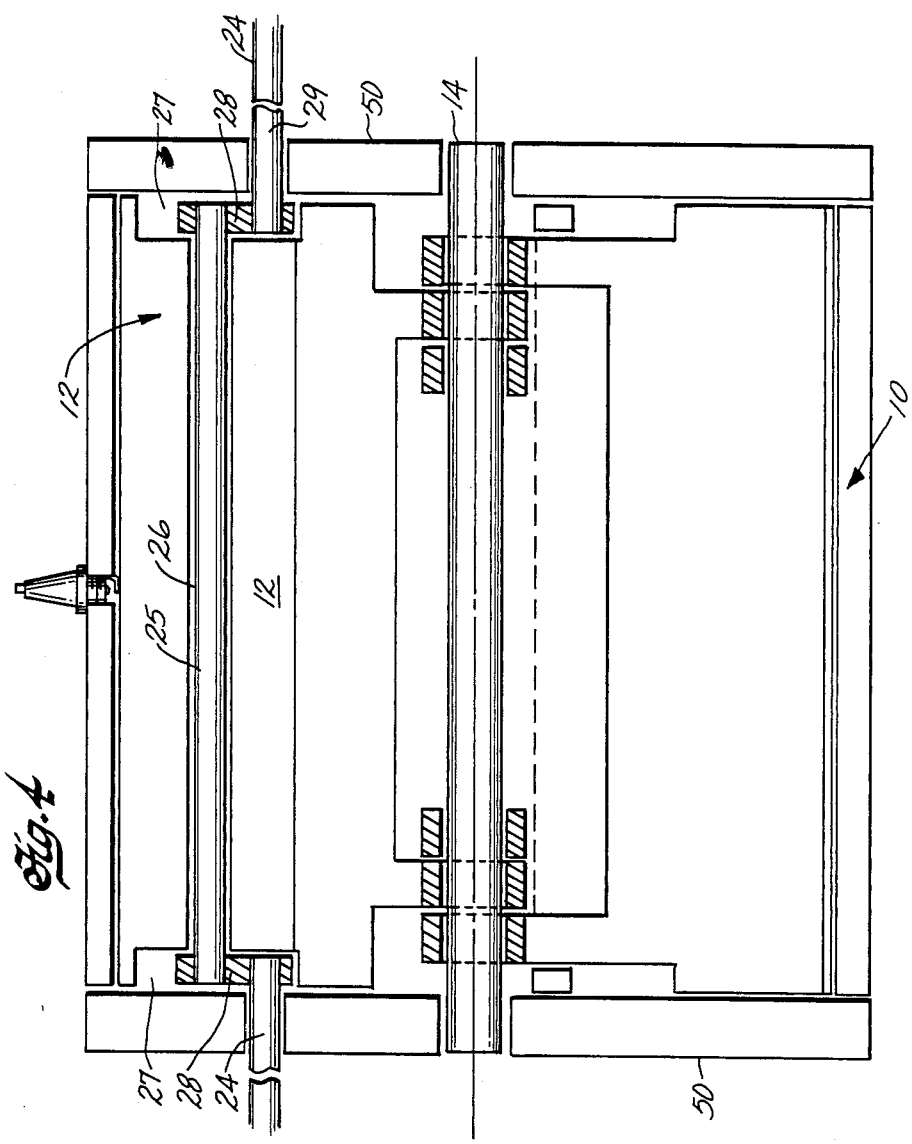
FIG. 4 is a cutaway view of the present invention taken parallel to the rotor's axis.

A pair of substantially flat end plates 50 shown in FIG. 4 are bolted onto the ends of the drum 49 to seal the casing 10. Since the casing 10 is simply a drum with flat plates bolted to its ends, it is very easy to manufacture to high tolerances.

The rotor 12 is also a cylinder with about the same length as the casing 10 but a smaller radius than the casing. For example, in the embodiment shown, the rotor 12 has an outer diameter equal to about 80% of the inner diameter of the casing 10. The rotor comprises an axial bore 15 to accommodate the central shaft 14. The central shaft 14 is a bar or rod connected to the end plates 50 that traverses the length of the casing 10 along its axis. The rotor 12 and the central shaft 14 are also easy to manufacture to high tolerances because they are simple cylindrical units.

The central shaft 14 is the mounting point for the vanes 16. In the embodiment shown, there are three vanes 16 but a larger or smaller number could be used, as desired. The vanes 16 are pivotally mounted on the shaft 14 and extend from the central shaft 14 radially outwardly to the interior surface of the casing 10, dividing the space between the rotor 12 and the casing 10 into three combustion chambers 41, 42 and 43. The vanes 16 carry seals 18 which engage the casing 10 and pivoting segments 20 which engage the rotor 12. The vanes 16 extend through slots 22 in the rotor 12. The slots 22 are shaped so that the rotor 12 only engages the vanes 16 at the pivoting segments 20. In such an arrangement, the rotor 12 can orbit within the casing 10 without being hindered by the vanes 16.

The rotary engine 9 comprises three crankshafts 24. Like the number of vanes 16, the number of crankshafts 24 can vary as desired. With particular reference to FIG. 4, each crankshaft 24 comprises a mounting shaft 25, a drive shaft 29 and a cross bar 28. The mounting shaft 25 extends through a bore 26 in the wall of the rotor 12. The ends of the mounting shaft 25 extend out of the rotor 12 into generally cylindrical recesses 27 in the ends of the rotor. One end of the transversely extending cross bar 28 is attached to each end of the mounting shaft 25. The cross bars 28 lie within the recesses 27, the other ends of the cross bars 28 being attached to the drive shafts 29 which extends outwardly from the rotor 12 through openings in the end plates 50. Suitable seals are provided between the end plate 50 and the drive shaft 29.

In the above arrangement, the drive shafts 29 and mounting shafts 25 are parallel with, but offset from, each other. The mounting shafts 25 orbit with the rotor while the drive shafts 29 remain fixed in location. Due to the orbiting motion, however, the entire crankshafts 24 rotate, making one revolution for each orbit.

The multiple crankshafts 24 create multiple power output sources. However, all the crankshafts 24 are mechanically coupled through the rotor 12. One of the three crankshafts 24 could be used for power takeoff alone, but balance and stability are enhanced if the power output of the crankshafts is combined and a flywheel is used. A variety of gear, chain, or belt systems well known in the art can be used to drive a single power takeoff shaft using all three crankshafts.

The intake and exhaust valves 30 and 32 are conventional in design and can be driven using any suitable system. A suitable arrangement for driving the valve system is shown, for example, in U.S. Pat. No. 3,964,442 to Hunter, which is incorporated herein by reference. The spark plugs can be operated using any number of existing ignition systems.

Figure 2:
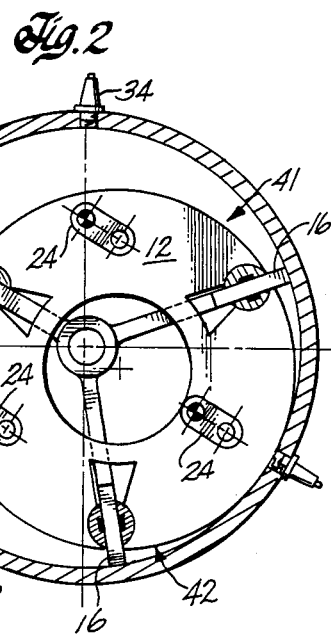
FIG. 2 is a cutaway view of the present invention after the rotor has orbited down and right, taken perpendicular to the rotor's axis.
Figure 3:
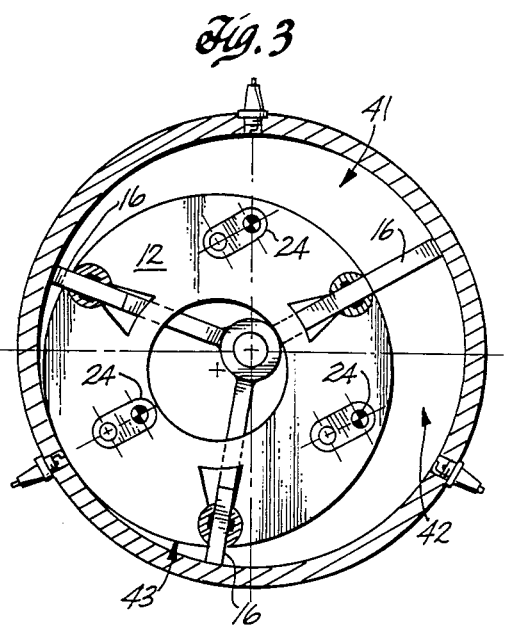
FIG. 3 is a cutaway view of the present invention after the rotor has orbited left, taken perpendicular to the rotor's axis.

FIGS. 1 through 3 illustrate the four-stroke cycle of this exemplary embodiment. In FIG. 1, the rotor 12 is at the highest point in the casing 10 that the crankshafts 24 will allow. In combustion chamber 41, both valves 30 and 32 are closed and the air/fuel mixture in the chamber is compressed. In combustion chamber 42, the exhaust valve 32 is open and the intake valve 30 is closed. The air/fuel mixture in this chamber has been recently ignited. This chamber is in the exhaust stroke. In combustion chamber 43, the intake valve 30 is open and the exhaust valve 32 is closed. This chamber is in the intake stroke.

In FIG. 2, chamber 41 has almost completed its power stroke. The spark plug 34 has fired and the burning air/fuel mixture has forced the rotor 12 downward. The crankshafts 24 have converted some of that downward force to the right. The volume of combustion chamber 43 has not been affected substantially by the motion of the rotor. Having completed its intake stroke, combustion chamber 43 begins its compression stroke.

The momentum of the rotor 12 carries it to the left in the drawings where it compresses the fuel/air mixture in combustion chamber 43. As shown in FIG. 3, chamber 43 is ready for its power stroke. Combustion chamber 41 is in its exhaust stroke and combustion chamber 42 is in its intake stroke.

After one more orbit of the rotor 12, all three combustion chambers will have finished a complete four-stroke cycle. The drawings show that, in its cycles, the rotor 12 does not rotate but orbits about the centershaft 14, sliding up and down on the vanes 16. The vanes 16 move towards each other and away from each other freely as the rotor 12 compels. Because of this action, the pivoting segments 20 between the rotor 12 and the vanes 16 must permit both sliding and pivoting.

Referring to FIG. 1, the pivoting segments 20 comprise lateral seals 36 which allow the rotor to slide radially. The seals 36 are mounted in partial cylindrical seals 38 which pivot within cylindrical sockets 39 in the rotor 12. The lateral seals 36 create a seal between the vanes and the pivoting segment 20. The partial cylindrical seals 38 create a seal between the pivoting segment 20 and the rotor 12. Because the vanes 16 do not move over a large surface, long lasting seals can be constructed at a reasonable expense.

Another exemplary embodiment is illustrated in FIGS. 5–12. This embodiment is a two-stroke cycle, single rotor, three-chamber rotary engine. As with the first embodiment, the casing 60 comprises a cylindrical drum 61 and a pair of end plates 62. The drum 61 is fitted with intake ports 64, exhaust ports 66, and spark plugs 68.

The rotor 70 is also cylindrical and, like that of the first embodiment, has a diameter approximately 80% of that of the casing. The rotor 70 has a cylindrical bore through its center, through which a central shaft 72 extends. The central shaft 72 is attached to the end plates. Vanes 74 are pivotally mounted on the shaft 72 and extend radially outward from the shaft 72 through the rotor 70 and pivoting segments 76 to the interior surface of the casing 60. The ends of the vanes 74 remote from the shaft 72 comprise curved heads 78. The heads open and close the intake and exhaust ports 64 and 66.

A plurality of stepped crankshafts 79, generally as described above are rotatably mounted on the rotor 70 and extend outwardly from the ends of the rotor 70 through openings in the casing 60. The motion of the rotor 70, the action of the crankshafts 79, and the form of the pivoting segments 76 is substantially the same as in the first exemplary embodiment and will not be described in detail here. The present embodiment differs in the construction of the vane heads and in its two-stroke cycle.

Figure 5:
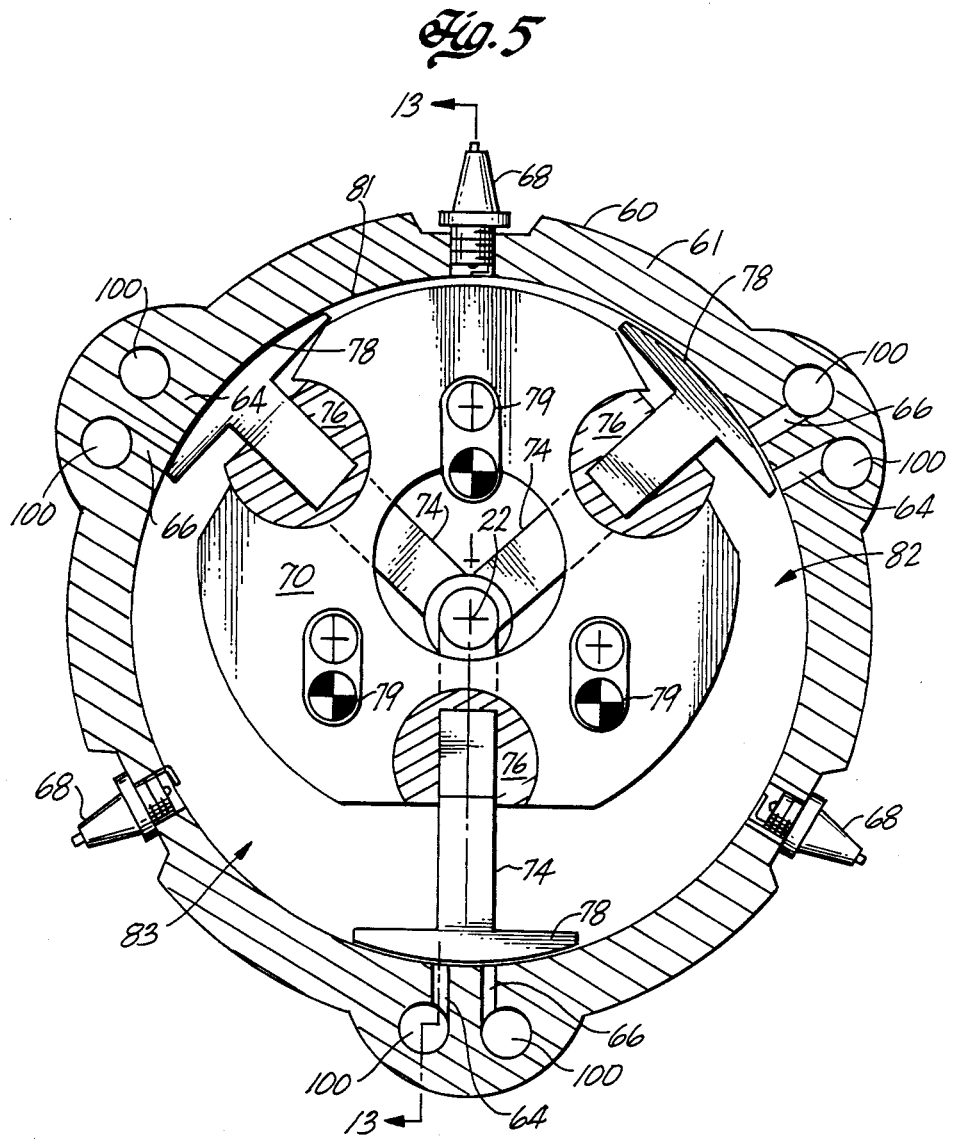
FIG. 5 is a cutaway view of a second embodiment of the present invention taken perpendicular to the rotor's axis.

In FIG. 5, the rotor 60 is in its extreme upper position. The air/fuel mixture in chamber 81 is compressed. All the intake ports 64 and exhaust ports 66 are closed by the vane heads 78.

For simplicity, only the cycle of chamber 82 will be discussed. The operation of the other chambers is identical but shifted in phase. Chamber 81 is 120° behind chamber 82, and chamber 83 is 120° ahead of chamber 82.

Figure 6:
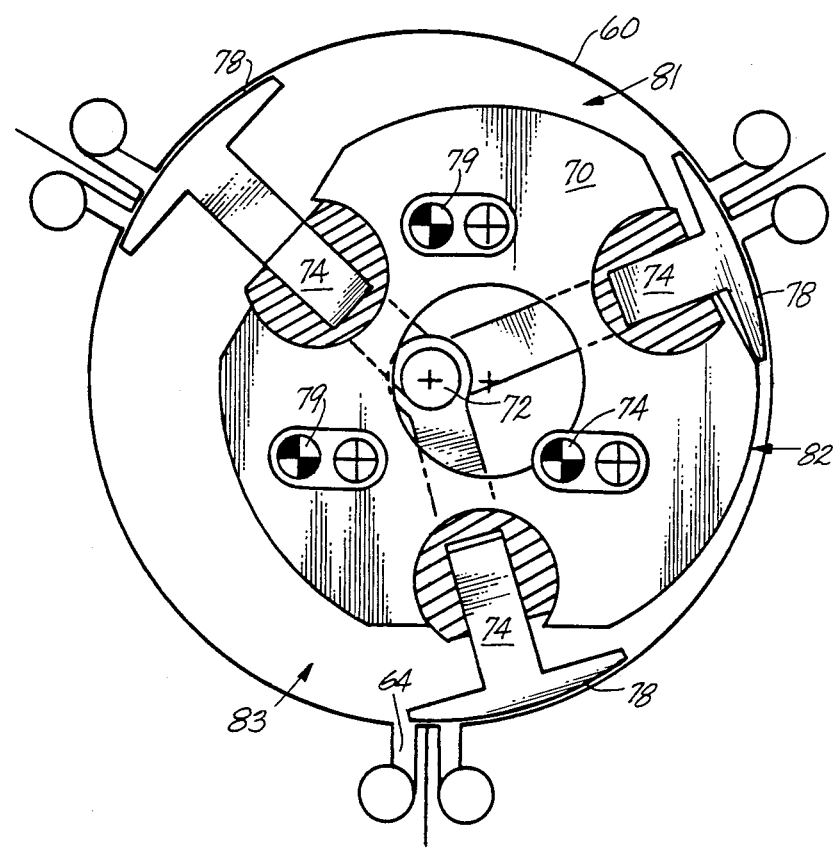
FIG. 6 is a cutaway view of a second embodiment of the present invention after the rotor has advanced 90° from the position shown in FIG. 5.

When the spark plug of chamber 81 fires, the air fuel mixture in chamber 81 burns and expands, forcing the rotor 70 down and to the right, as shown in FIG. 6. The intake and exhaust ports of chamber 82 remain closed. At this time the compression stroke for chamber 82, which is already filled with a fuel air mixture, is about to finish.

Figure 7:
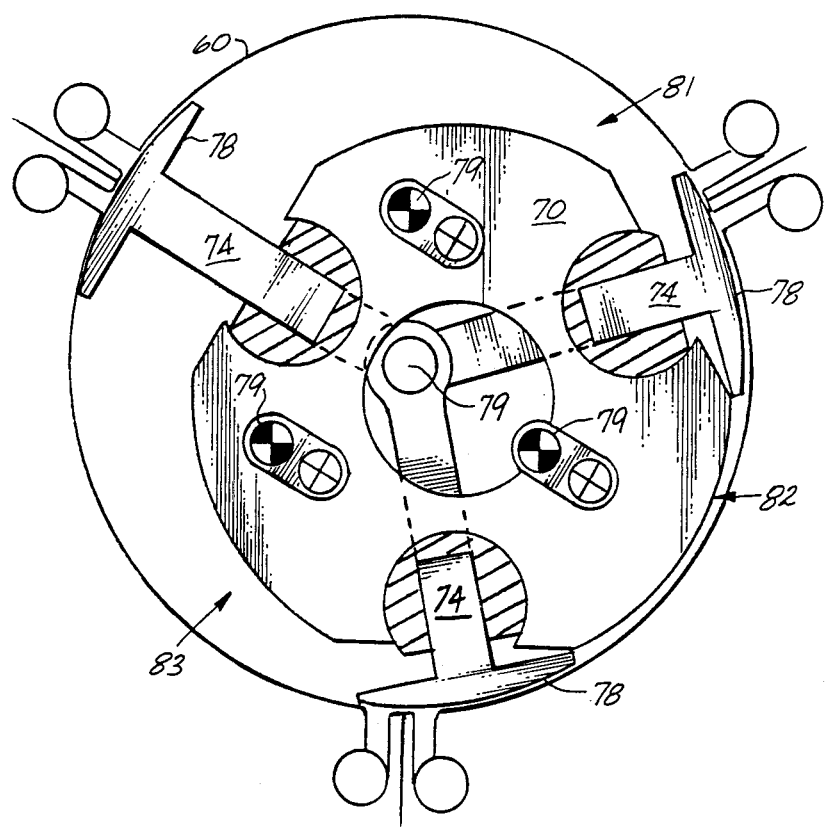
FIG. 7 is a cutaway view of a second embodiment of the present invention after the rotor has advanced 120° from the position shown in FIG. 5.

With reference to FIG. 7, chamber 82 is almost at its minimum volume. The fuel air mixture is fully compressed. The spark plug of chamber 82 fires and chamber 82 begins its power stroke.

Figure 8:
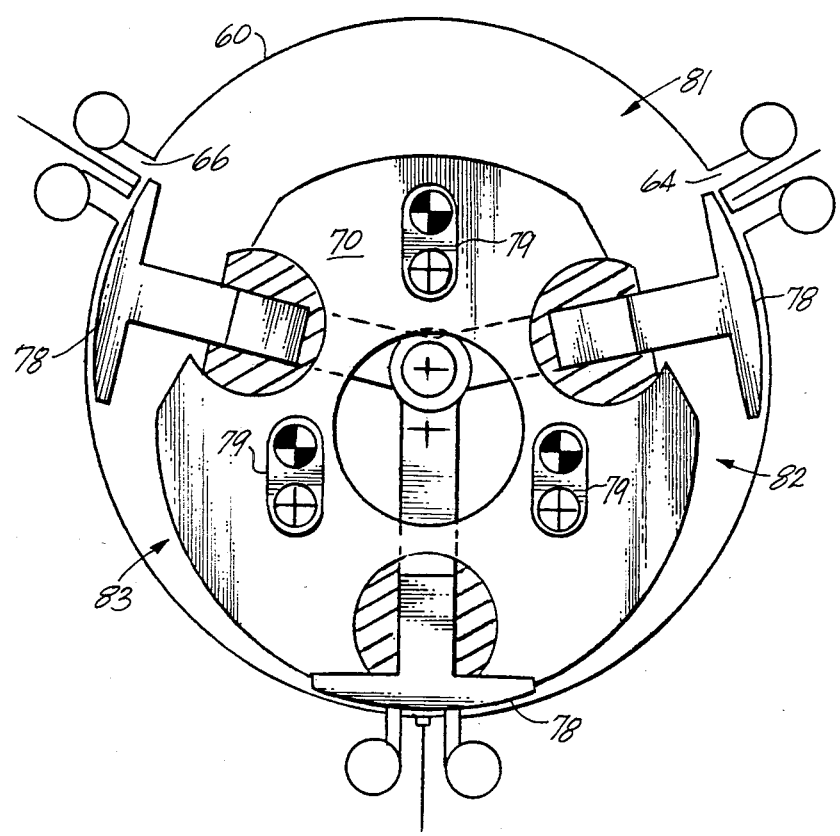
FIG. 8 is a cutaway view of a second embodiment of the present invention after the rotor has advanced 180° from the position shown in FIG. 5.

In FIG. 8, the power stroke has begun. The rotor 70, constrained by the crankshafts 79, is driven to the left and upwardly in the drawings. Both ports of chamber 82 remain closed.

Figure 9:
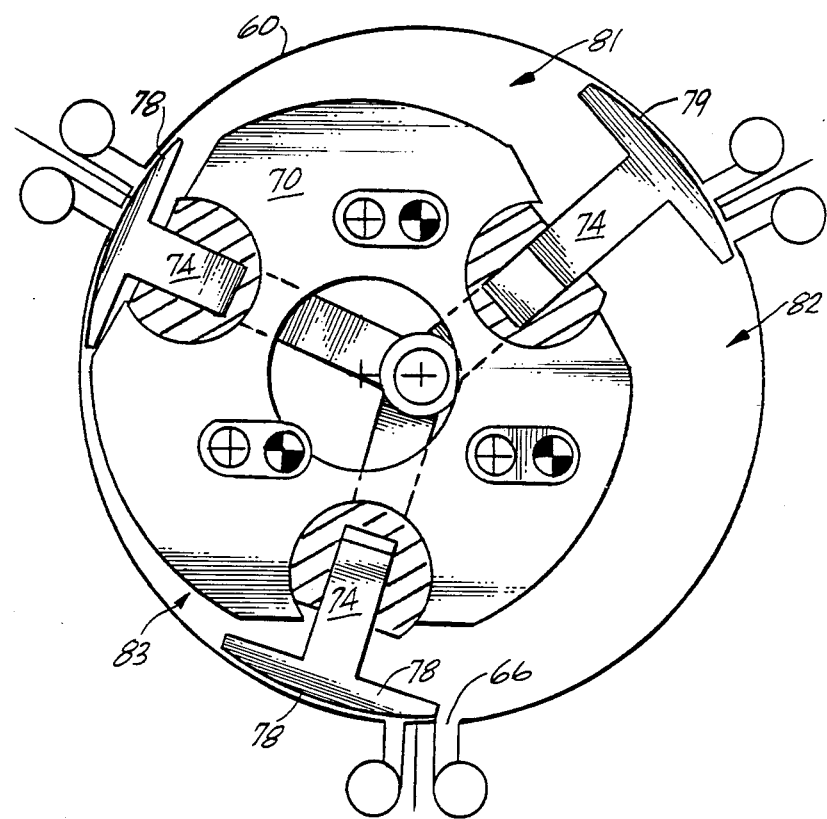
FIG. 9 is a cutaway view of a second embodiment of the present invention after the rotor has advanced 270° from the position shown in FIG. 5.
Figure 10:
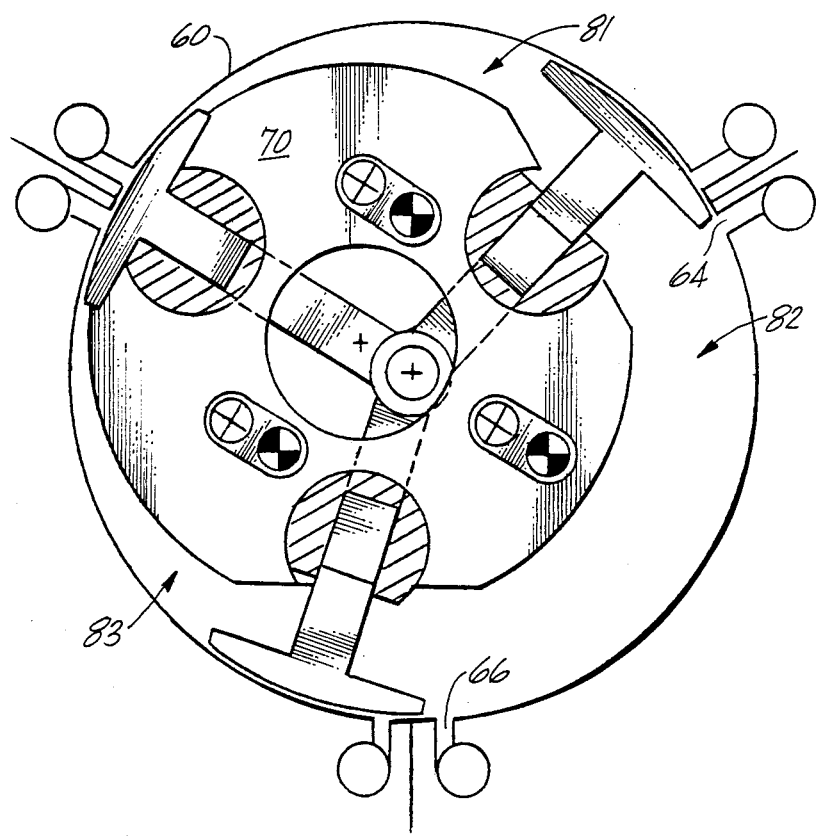
FIG. 10 is a cutaway view of a second embodiment of the present invention after the rotor has advanced 300° from the position shown in FIG. 5.

In FIG. 9, the orbiting motion of the rotor 70 has caused the lower vane 74 to move clockwise far enough that the head 78 of the vane 74 has uncovered the exhaust port 66 for chamber 82. Chamber 82 is almost at its maximum volume and begins its exhaust stroke. Residual expansion energy in the exhaust gases compels the exhaust gases to pass out of the combustion chamber 82 through the exhaust port 66. As shown in FIG. 10, the intake port 64 and exhaust port 66 are opened simultaneously for a short period so that the chamber can be filled by fresh fuel and air.

Figure 11:
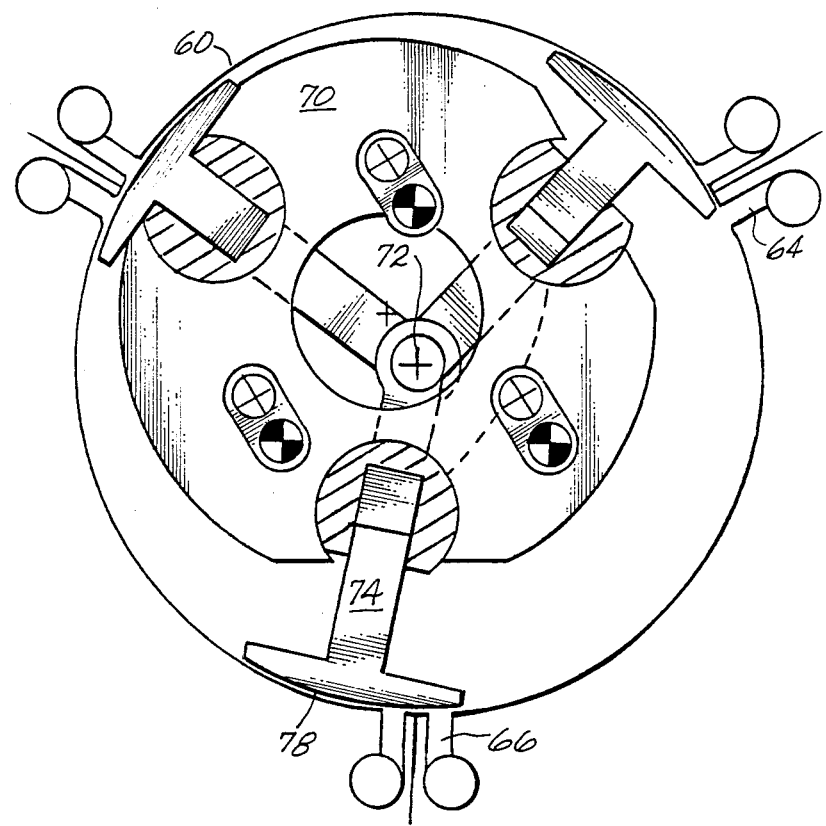
FIG. 11 is a cutaway view of a second embodiment of the present invention after the rotor has advanced 330° from the position shown in FIG. 5.

In FIG. 11, the rotor 70 has orbited up and to the right, forcing the head 78 of the lower vane 74 to close the exhaust port 66 for chamber 82. After the exhaust port is closed and while the intake port 64 is still open, additional fuel air mixture is pumped into the combustion chamber through an external pump, for example, a super charger or other blower well-known in the art.

The intake port then closes and the compression stroke begins, as shown in FIG. 5. The cycle repeats. In the present embodiment, each chamber fires once for each orbit of the rotor, separated by 120°.

FIG. 12 is an enlarged view of a vane for the present embodiment showing primarily the various seals. The vane 74 includes a radial seal 90 against each of the end plates 62, outer axial seals 92 between the vane head 78 and the casing 60, and an outer vane head seal 94, between the end of the vane head and the end plate. Between the ports 64 and 66, there is a port seal 96. The rotor 70 is fitted with end seals 98 to seal the combustion chambers 82 and 83 at the end plates, and the seal 101 seals the pivoting segments 76 against the end plates. These seals, in conjunction, prevent leaks from the combustion chambers and the intake and exhaust ports.

FIG. 13 shows a side view of the present embodiment. A comparison between FIG. 13 and FIG. 4 shows the similarity of the two embodiments. FIG. 12 differs from FIG. 4 in that FIG. 12 shows an intake bore 100. This bore 100 extends through the casing and connects to a row of intake ports 64. The many small intake ports spread the fuel air mixture more evenly through the combustion chamber than a single large port. A similar exhaust bore (not shown) is connected to a row of exhaust ports.

Rather than a row of intake and exhaust ports in the drum of the casing, it is understood that the intake and exhaust ports may be located in the end plates. In such an embodiment, it is presently preferred that the intake ports be located in one end plate and the exhaust ports be located in the opposite end plate. Opening and closing of the intake and exhaust ports may be performed by the vanes or, alternatively, by the end walls of the rotor.

While only three chamber embodiments have been described, the present invention can be constructed with any number of combustion chambers of 2 or more by increasing the number of vanes, ports and spark plugs. The present invention could also be converted into a multiple rotor engine simply by adding additional casings and rotor assemblies and extending the crankshafts so that they engage the additional rotors. The engine can be made in a variety of sizes as well.

The present invention can be built as a diesel engine too. By adjusting the relative diameters of the rotor and casing, sufficient compression could be obtained to ignite a diesel fuel without the use of spark plugs.

Conventional well known features applied to internal combustion engines, for example, fuel injection, multiple valves, computer controlled combustion, turbo supercharging and the like, can also be easily adapted to operate with the present invention.

While this disclosure has revealed only a few embodiments, it will be obvious to one skilled in the art that many other embodiments are possible within the spirit and scope of this invention.

What is claimed is:

1. An internal combustion engine comprising:
   a hollow cylindrical casing sealed at both ends having a smooth cylindrical interior surface;
   a cylindrical rotor having an outer diameter less than the inner diameter of the casing and comprising an axial bore, the rotor being disposed within the casing and afforded orbiting movement but not rotational movement within the casing, and forming a chamber between the outer surface of the rotor and the interior surface of the casing, the rotor further comprising at least two radially extending apertures;
   a generally straight, non-power transmitting central pivot shaft extending the length of the casing coaxial with the casing and through the bore of the rotor but not connected with the rotor;
   at least two stepped crankshafts rotatably connected with the rotor and extending from at least one end of the rotor through the adjacent end of the casing whereby orbiting movement of the rotor causes the crankshafts to rotate;
   a vane pivotally mounted on the central shaft and extending radially outwardly through each aperture in the rotor to the interior surface of the casing, each vane having seals for engaging the casing and the rotor so that discrete sealed combustion chambers are formed between the vanes, the interior surface of the casing and the outer surface of the rotor; and
   intake and exhaust ports permitting combustion elements to be admitted and released from each combustion chamber.

2. The internal combustion engine of claim 1 in which each crankshaft comprises a mounting shaft rotatably connected to the rotor at a fixed position, a drive shaft which extends through an opening in the casing, and a step between the mounting shaft and drive shaft so that the drive shaft and mounting shaft are parallel with each other but not coaxial.

3. The internal combustion engine of claim 1 in which the seals between the rotor and vanes include pivoting segments between the vanes and the rotor which pivot within the rotor so that the vanes are allowed to pivot with respect to the rotor and the rotor is allowed to move along the lengths of the vanes.

4. The internal combustion engine of claim 1 further comprising valves mounted to the casing for opening and closing the intake and exhaust ports at preselected times during a combustion cycle.

5. The internal combustion engine of claim 1 further comprising an igniter mounted on the casing and extending into each combustion chamber so that the combustion elements in the combustion chamber may be ignited at the appropriate time during a combustion cycle.

6. The internal combustion engine of claim 1 further comprising means for opening and closing the intake and exhaust ports at preselected times during a combustion cycle as the result of the orbiting motion of the rotor.

7. The internal combustion engine of claim 1 wherein each combustion chamber comprises one set of intake and exhaust ports and the vanes comprise enlarged heads and wherein the orbiting motion of the rotor causes the vanes to move and thereby open and close the intake and exhaust ports at preselected times during a combustion cycle.

* * * * *